United States Patent
Riley et al.

(10) Patent No.: US 6,456,204 B1
(45) Date of Patent: Sep. 24, 2002

(54) DATA TRANSFER INDICATOR CIRCUIT

(75) Inventors: Marc B. Riley, Marietta; Ashok R. Patil, Duluth, both of GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/676,344

(22) Filed: Sep. 29, 2000

(51) Int. Cl.[7] ............................................. G08B 5/22
(52) U.S. Cl. ................ 340/815.45; 340/653; 340/654; 340/691.6; 439/62; 714/46; 714/712
(58) Field of Search ........................ 340/815.45, 635, 340/653, 654, 659, 691.6; 714/46, 712; 439/63

(56) References Cited

U.S. PATENT DOCUMENTS

| | | | | |
|---|---|---|---|---|
| 5,081,627 A | * | 1/1992 | Yu ........................ | 340/815.45 |
| 5,675,524 A | * | 10/1997 | Bernard .................... | 708/109 |
| 5,886,642 A | * | 3/1999 | Barmore, Jr. ........... | 340/815.45 |
| 6,161,140 A | * | 12/2000 | Moriya ....................... | 709/228 |
| 6,191,699 B1 | * | 2/2001 | Sawada .................. | 340/815.45 |
| 6,198,405 B1 | * | 3/2001 | Andersson et al. ..... | 340/815.45 |

* cited by examiner

Primary Examiner—Daniel J. Wu
(74) Attorney, Agent, or Firm—Philip H. Burrus, IV

(57) ABSTRACT

An apparatus for indicating data transfer between a personal electronic device and a host device includes a common node that connects at least one data line to the personal electronic device and at least one data line to the host device. A high impedance amplifier has an input electrically coupled to the common node and generates an amplified signal corresponding to a signal value present on the common node. A monostable circuit is responsive to the amplified signal and generates a plurality of electrical pulses when the amplified signal exhibits changes in value corresponding to a data transfer through the common node. A lamp driver circuit, that is responsive to the plurality of electrical pulses, generates pulses of light correspond to the electrical pulses. Each of the plurality of electrical pulses is of sufficient duration so that each of the pulses of light is of sufficient duration to be perceived by a human eye.

5 Claims, 1 Drawing Sheet

DATA TRANSFER INDICATOR CIRCUIT

BACKGROUND OF THE INVENTION

1. Field of the Invention

The present invention relates to electronics and, more specifically, a device for indicating data transfer.

2. Description of the Prior Art

Data transfer between personal electronic devices, such as personal data assistants, and computers is becoming increasingly common. Typically, such devices sit in a cradle that has a data port that is connected to a corresponding data port of the computer. Some personal electronic devices are hybrid devices, such as a combination of a cellular telephone and a personal data assistant. Hybrid devices may have chargers that charges the batteries of the device, but that also act as data transfer cradles.

Many data transfer cradles include an indicator that alterts the user when a data transfer is actively taking place. This is to alleviate the user's fears that the computer is stuck in an infinite loop, rather than actively transferring data. Such an indicator often takes the form of a light that is embedded in the data transfer cradle.

The data transfer cradle often includes a micro-controller that participates in the data transfer process and drives the indicator light. However, it is not always necessary to include a micro-controller in a data transfer cradle, as most personal electronic devices include logic devices that can administer data transfer. Furthermore, micro-controllers tend to be more expensive than discrete components.

Therefore, there is a need for a circuit comprising discrete electronic components that can sense a data transfer without substantially changing the electrical properties of the data signals being sensed and indicate to a user when a data transfer is occurring.

DETAILED DESCRIPTION OF THE INVENTION

Figure 1:
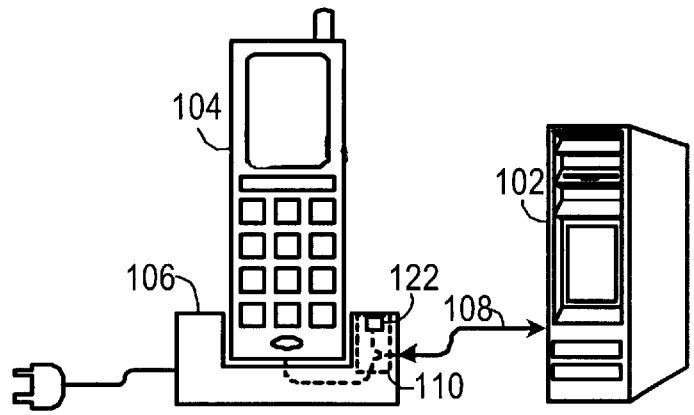
FIG. 1 is a conceptual diagram of one embodiment of the invention employed in a battery charger/data transfer device.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment of the invention is included in a recharging/data transfer cradle 106, such as one used to transfer data between a hybrid personal data assistant/cellular telephone 104 and a computer 102 via a data bus 108. Illustrative examples of such data busses 108 include an RS-232 bus and a Universal Serial Bus (USB). The data bus is connected to a data transfer indicator circuit 110 that includes a light emitting diode (LED) 152 that indicates data transfer activity.

Figure 2:
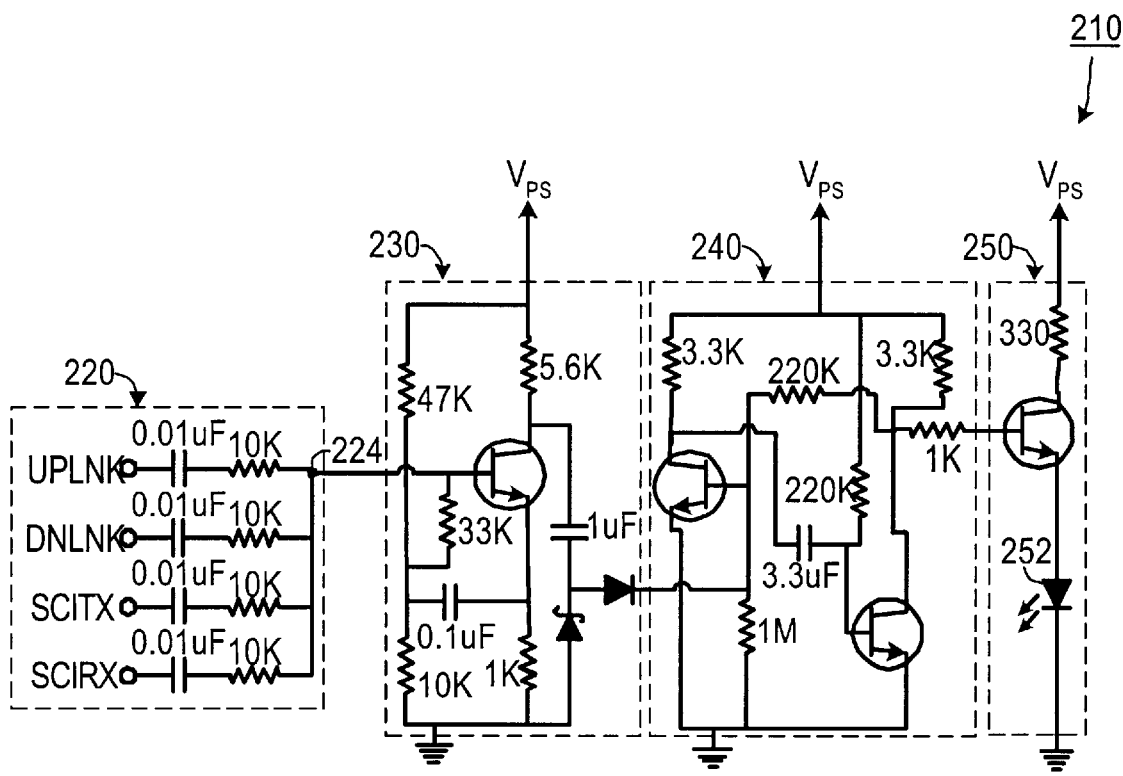
FIG. 2 is a schematic diagram of one illustrative embodiment of the invention.

As shown in FIG. 2, the data transfer indicator circuit 210 includes a common node 224 that connects the data lines 220 used in data transfer to each other. Each of the data lines is coupled to the common node 224 through an impedance enhancing circuit (such as the capacitor-resistor combination shown) to prevent interference in data transmission through the common node 224. Typically, only one data line will be active at any given time. In the embodiment shown, the circuit can handle two data transfer protocols: both direct uplink/downlink and SAC (RS-232). However, many other data transfer protocols could be employed with the invention.

A high impedance amplifier 230 has an input electrically coupled to the common node 224 and generates an amplified signal corresponding to a signal value present on the common node 224. The amplifier 230 should have an impedance sufficient to prevent substantial degradation of the data being transferred. An op-amp may not work well in applications that require a high slew rate. Thus, in the embodiment shown, discrete components are used.

Because the data rate of the circuit is so fast that pulses of light lasting as long as the actual bits of data would be undistinguishable to the human eye, a monostable circuit 240 is employed to generate slower pulses whenever data is being transferred. The monostable circuit 240 is responsive to the amplified signal and generates a plurality of electrical pulses when the amplified signal exhibits changes in value corresponding to a data transfer through the common node 224.

A lamp driver circuit 250, that is responsive to the plurality of electrical pulses from the monostable circuit 240, generates pulses of light correspond to the electrical pulses. Each of the plurality of electrical pulses is of sufficient duration so that each of the pulses of light may be perceived by a human eye. In one embodiment, it was found that a 1 Hz rate produced satisfactory results. The lamp driver circuit 250 typically includes an LED 252 driven by a transistor 254, or other switching element.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. An apparatus for indicating data transfer between a personal electronic device and a host device, comprising:
   a. a common node coupled to a plurality of data lines;
   b. a high impedance amplifier that has an input electrically coupled to the common node and that generates an amplified signal corresponding to a signal value present on the common node;
   c. a monostable circuit that is responsive to the amplified signal and that generates a plurality of electrical pulses when the amplified signal exhibits changes in value corresponding to a data transfer through the common node; and
   d. a lamp driver circuit, responsive to the plurality of electrical pulses, that actuates a single light emitting device in response to the electrical pulses, wherein the actuation of the single light emitting device is of sufficient duration so as to be perceived by a human eye.

2. The apparatus of claim 1, wherein each data line is coupled to the common node through an impedance enhancing circuit.

3. The apparatus of claim 1, wherein the lamp driver circuit comprises:
  a. a light generating element that generates light when a voltage is applied thereto; and
  b. a switching element that couples the light generating element to a voltage source each time one of the plurality of electrical pulses is asserted.

4. The apparatus of claim 3, wherein the switching element comprises a transistor.

5. The apparatus of claim 4, wherein the light generating element comprises a light emitting diode.

* * * * *